(12) United States Patent
Sano et al.

(10) Patent No.: US 6,836,518 B1
(45) Date of Patent: Dec. 28, 2004

(54) SYNCHRONIZATION CONTROL METHOD FOR RECEIVER APPARATUS OF DATA TRANSMISSION SYSTEM UTILIZING ORTHOGONAL FREQUENCY DIVISION MULTIPLEX, AND DATA TRANSMISSION SYSTEM

(75) Inventors: Seiichi Sano, Higashiyamato (JP); Atsushi Miyashita, Tokorozawa (JP); Yoshikatsu Wagatsuma, Kodaira (JP)

(73) Assignee: Hitachi Kokusai Electric Inc., Tokyo (JP)

(*) Notice: Subject to any disclaimer, the term of this patent is extended or adjusted under 35 U.S.C. 154(b) by 744 days.

(21) Appl. No.: 09/712,971

(22) Filed: Nov. 16, 2000

(30) Foreign Application Priority Data

Nov. 16, 1999 (JP) .......................................... 11-324825

(51) Int. Cl.[7] ............................................. H04L 27/06
(52) U.S. Cl. ...................................................... 375/343
(58) Field of Search ................................. 375/354–376, 375/324, 260, 343; 370/70, 19, 23, 105.3, 516, 503, 208, 343

(56) References Cited

U.S. PATENT DOCUMENTS

| 5,471,464 | A | * | 11/1995 | Ikeda | 370/203 |
|---|---|---|---|---|---|
| 5,596,582 | A | | 1/1997 | Sato et al. | 370/509 |
| 5,608,764 | A | * | 3/1997 | Sugita et al. | 375/344 |
| 5,619,507 | A | | 4/1997 | Tsuda | 370/350 |
| 5,815,539 | A | * | 9/1998 | Lennen | 375/371 |
| 5,953,311 | A | * | 9/1999 | Davies et al. | 370/210 |
| 6,044,277 | A | | 3/2000 | Tsuda | 455/522 |
| 6,052,405 | A | * | 4/2000 | Nakano | 375/150 |
| 6,147,982 | A | * | 11/2000 | Sourour et al. | 370/324 |
| 6,246,735 | B1 | | 6/2001 | Sano et al. | 375/364 |

* cited by examiner

Primary Examiner—Stephen Chin
Assistant Examiner—Jason M. Perilla
(74) Attorney, Agent, or Firm—Antonelli, Terry, Stout & Kraus, LLP

(57) ABSTRACT

A data transmission system and method utilizing orthogonal frequency division multiplexing, wherein in a receiver apparatus of the data transmission system, synchronization is obtained by the following steps. A correlation value of a reception signal which was orthogonal frequency division multiplexed and a predetermined sync symbol pattern or a signal obtained by delaying one effective symbol period is arithmetically calculated a predetermined times in a predetermined arithmetic calculation window. The correlation values obtained after a predetermined number of arithmetic calculations from an intermediate of a total number of the arithmetic calculations are reduced so as to not exceed a predetermined value. The maximum value is detected from the correlation values and a reference signal for demodulating the reception signal is formed based on information of a time based position of a signal at the time when the maximum value is obtained.

23 Claims, 10 Drawing Sheets

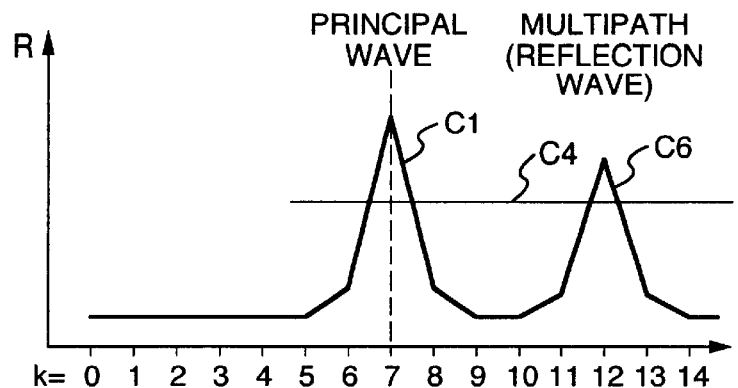
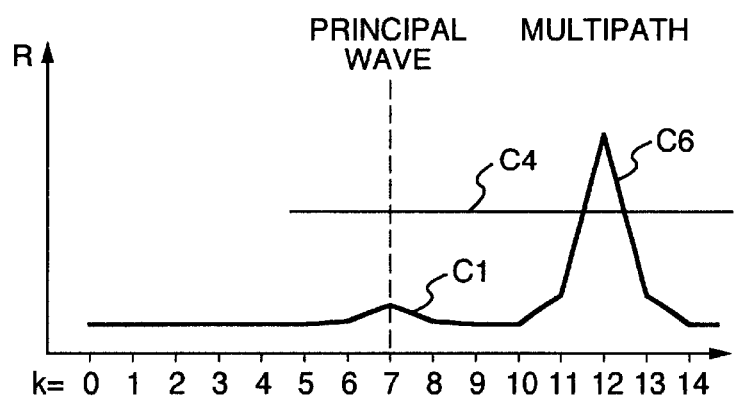
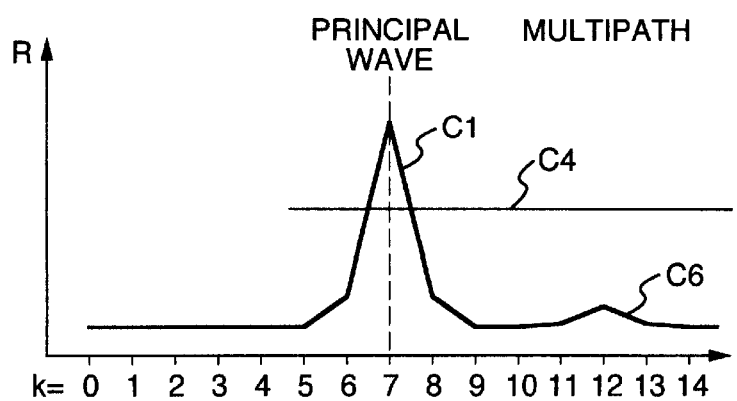

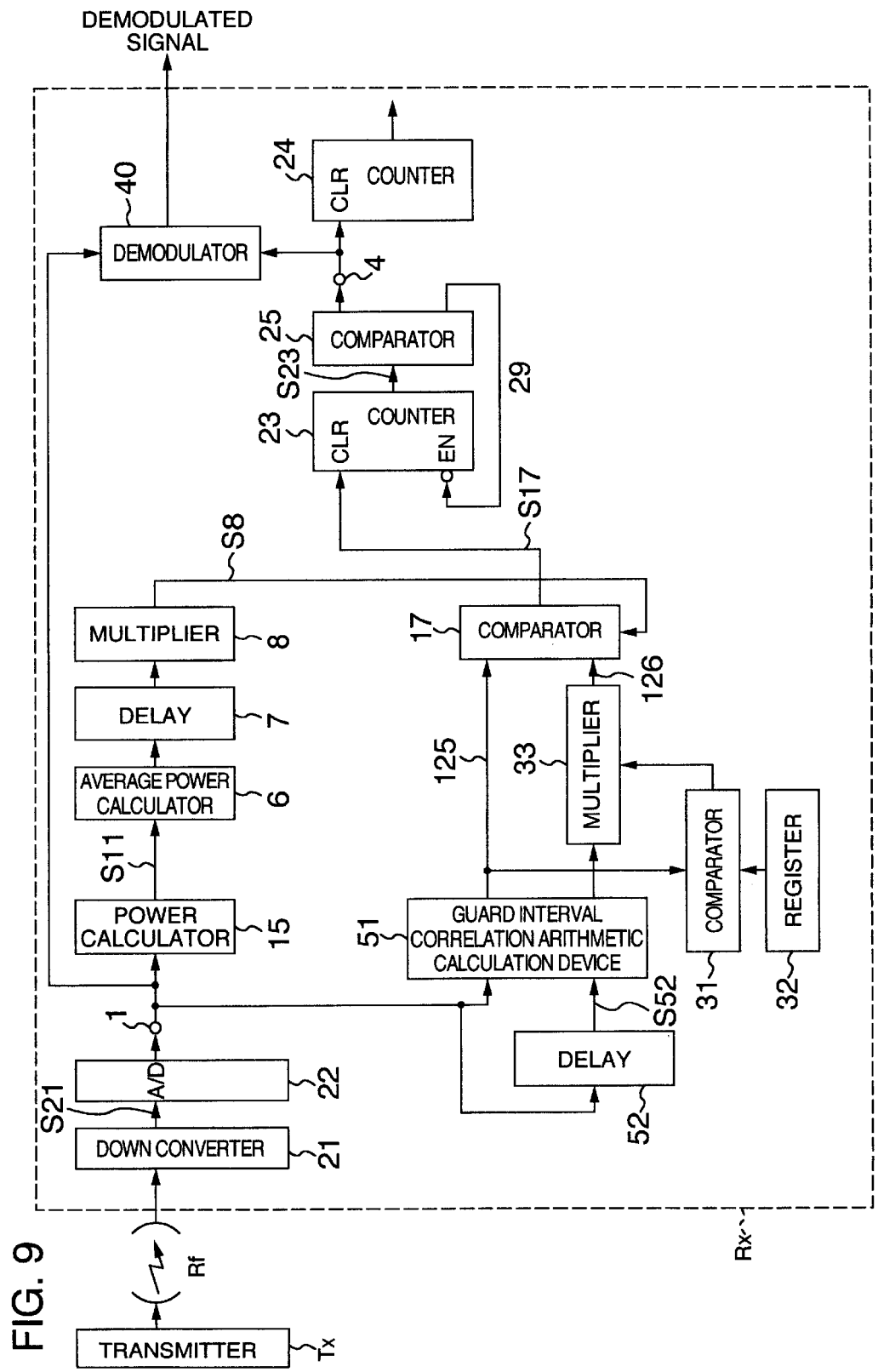

US 6,836,518 B1

SYNCHRONIZATION CONTROL METHOD FOR RECEIVER APPARATUS OF DATA TRANSMISSION SYSTEM UTILIZING ORTHOGONAL FREQUENCY DIVISION MULTIPLEX, AND DATA TRANSMISSION SYSTEM

CROSS-REFERENCE TO RELATED APPLICATION

The present application relates to subject matters described in U.S. patent application Ser. No. 09/203,564 filed on Dec. 2, 1998 now U.S. Pat. No. 6,246,735 and assigned to the same assignee of the present invention and the disclosure thereof is hereby incorporated by reference.

BACKGROUND OF THE INVENTION

The invention relates to a synchronization control method for a data transmission system utilizing an orthogonal frequency division multiplex and its transmission system.

In recent years, as a signal multiplex system for a digital radio communications for mobile terminals or terrestrial systems, attention has been paid to an orthogonal frequency division multiplex (hereinafter, referred to as an OFDM system) having a feature such that it is strong against a multipath fading or ghost.

According to such a system, an information code is transmitted by using a signal obtained by digitally modulating tens to hundreds of kinds of a number of carrier waves arranged with a same frequency interval fs by a symbol frequency fsy (=1/Tsy), namely, by using an OFDM signal (orthogonal frequency division multiplexed signal).

In the case where a transmission signal which was modulated by such a system and transmitted is received and demodulated on a reception side, first, it is necessary to obtain synchronization from the received OFDM signal.

In this case, the operation to obtain synchronization of the OFDM signal denotes that a head position of a data symbol is detected from the OFDM reception signal by a receiver apparatus and a demodulating process is started in accordance with a timing of the head position. To obtain the synchronization, therefore, it is necessary to obtain a reference signal showing the timing of the head position of the data symbol.

For this purpose, there has been proposed a method whereby, on a transmission side, a null interval serving as a non-signal period and a sync symbol group such as a sweep signal or the like having a signal component which changes from the highest frequency to the lowest frequency of a transmission band for a predetermined period are previously inserted to the head of a transmission frame serving as a unit of a data transmitting process and they are detected and synchronization is obtained on a reception side ("A Study or Field Pickup Unit using OFDM Modulation Scheme", Technical Report of The Institute of Television Engineers of Japan, Vol. 19, No. 18, issued on August, 1995). As an example of a specific method for the detection of the null interval and the clock synchronization using the sweep signal, there is the invention disclosed in U.S. patent application Ser. No. 09/203,564 filed on Dec. 2, 1998, according to the invention of the same applicant as that of the present invention.

The method of obtaining synchronization of the null interval and the OFDM signal having no sweep signal has been disclosed in U.S. Pat. No. 5,602,835 registered on Feb. 11, 1997. In this method, as mentioned later, a transmitted OFDM signal includes a time-axis base data signal obtained by OFDM-modulation of one symbol signal and a guard interval added to a head of the time-axis base data signal, wherein the guard interval is produced by copying a predetermined tail part of the time-axis base data signal. According to the method, a calculation for obtaining a mutual correlation value, that is a degree (intensity) of correlation between two signals, of the OFDM reception signal and the signal obtained by delaying the reception signal by one effective symbol is implemented. The effective symbol means a single symbol without the guard interval. According to the method, since there is a delay of one effective symbol period between the received signal and the delayed signal, a point where a data signal for a predetermined period at the end of a data symbol of the reception signal and a guard interval added at the head of the data symbol of the delay signal coincide on the time axis, and a correlation value becomes the maximum value is obtained. The demodulating operation of the reception signal is performed by setting a position on a time base at the time of obtaining the maximum value to a reference.

A method of obtaining synchronization of an OFDM signal by using a sync symbol group will be briefly explained hereinbelow with reference to FIG. 3.

FIG. 3 shows a synchronization detecting unit of a demodulating unit on a receiving unit side of a digital data transmission system in which a transmission signal in which null intervals have been inserted at regular periods is received, an electric power value of the reception signal is obtained, a magnitude of the obtained power value is discriminated by a comparator, the null interval is detected, and synchronization with the reception signal is obtained.

An RF transmission signal of the OFDM system which has been transmitted from a transmitter Tx and in which the null intervals have been inserted at regular periods is received by a receiver Rx, the RF signal is converted into a baseband signal S21 by a down-converter 21 of the receiver Rx, and a digital reception signal obtained by digitally converting the signal S21 by an A/D converter 22 is supplied to a terminal 1. An instantaneous power value of the digital reception signal supplied to the terminal 1 is obtained by a power calculator 15.

An average power of a power value S11 outputted from the power calculator 15 is obtained by an average power calculator 6. The average power is delayed by time corresponding to one symbol or more by a delay 7. A multiplier 9 increases an output (average power) of the delay 7 by 1/N time (N is a positive real number), thereby obtaining a threshold value S13 for comparing with the power value S11.

The level of the power value is discriminated by a comparator 12 of an adaptive type reception level discriminator 14. When the power value S11 is larger than the threshold value S13, an output S12 of the level discriminator 14 is set to the "High (H)" level. If S11 is smaller than the threshold value, the output S12 is set to the "Low (L)" level. Since the output itself of the adaptive type reception level discriminator 14 is used merely for discriminating the magnitude of the reception signal as mentioned above, whether the "L" level continues for a predetermined length (time) or not is not discriminated.

In a null interval discriminator 19, therefore, in the case where a state in which the output of the reception level discriminator 14 is at the "H" level continues for the predetermined length (time), it is determined that a null interval exists, and a null interval detection pulse S19 is generated.

By the construction as mentioned above, the null interval during which the "H" level or the "L" level continues for the predetermined length (time) is detected from the reception signal, thereby enabling a synchronizing position of a frame start point to be coarsely matched.

However, in order to more correctly demodulate the reception signal by the receiver Rx, in the receiver Rx, a count start point (start point of sampling a data symbol in a demodulator 40) of a frame counter 24 of the receiver Rx needs to be matched up to a precision of a 1-clock period based on the received reception signal.

As a method of accomplishing the above object, in the Transmitter Tx, besides a null symbol, a sync symbol for showing a specific time point on a time base is inserted into a transmission signal to be transmitted.

As a sync symbol to be inserted, there is a sweep signal, a PN code, or the like which changes from the predetermined highest frequency to the lowest frequency.

A case of using the baseband signal S21 in which a sweep symbol (sync symbol) has been inserted subsequently to the null symbol will be described hereinbelow with reference to a signal diagram of FIG. 4. A frequency component included in the sweep symbol of the baseband signal S21 is shown at (q) in FIG. 4.

A correlation between a reference signal (the same sweep signal as that of (q) in FIG. 4) which is equivalent to a frequency pattern of a sweep signal set in the receiver Rx in a sweep correlation arithmetic operating device 2 in FIG. 3 and the received baseband signal S21 shown (p) in FIG. 4 is arithmetically operated. The sweep correlation arithmetic operation ranges at k=0 and k=14 are shown in FIG. 4 as arithmetic calculation windows for correlation.

As shown in FIG. 4, according to such a correlation arithmetic operation, a peak of a correlation value in the 1-symbol period is detected while a sampling point to start the correlation arithmetic operation is sequentially shifted by a 1-clock period at a time.

For example, assuming that the number (k) of times of the correlation arithmetic operation is set to 15 and, each time the start point of the correlation arithmetic operation is sequentially shifted one by one (k=1 at a time) from k=0 to k=14, the result of the correlation arithmetic operation is plotted, the result is as shown at (r) in FIG. 4. An axis of abscissa denotes a sampling point and an axis of ordinate indicates a correlation value. FIG. 5 is an enlarged diagram of (r) in FIG. 4.

In the example, it is shown that the maximum correlation exists at the seventh sample (k=7) from the correlation arithmetic operation start point.

The null interval detection signal S19 which is generated when the null interval is detected by the null interval discriminator 19 in FIG. 3 is inputted to a counter 27 for adjusting the timing for starting the sweep correlation arithmetic operation, and a counter value is cleared.

In a comparator 26, when a count output S27 of the counter 27 reaches a value set by a constant register 28, a correlation arithmetic operation start signal S26 is generated. The signal S26 is used as a correlation arithmetic operation start timing of the sweep correlation arithmetic operating device 2.

Whether the value of the peak of the correlation arithmetic operation calculated by the correlation arithmetic operating device 2 has significance or not is subsequently discriminated. A method of discriminating the significance will be described with reference to FIGS. 3 and 5. The value of the correlation arithmetic operation is proportional to the level of the reception signal.

In FIG. 3, the baseband reception signal is subjected to the foregoing sweep correlation arithmetic operation by the sweep correlation arithmetic operating device 2, so that a sweep correlation value 124 is obtained. The sweep correlation value 124 is shown at C1 in FIG. 5.

Since the sweep correlation arithmetic operation is performed while the sampling point is shifted one by one from the correlation arithmetic operation start point, both the sweep correlation value 124 and the number of arithmetic operating times 125 showing how many times the correlation arithmetic operation has been performed at the time of the value 124 (the number of times is shown by k) are outputted from the sweep correlation arithmetic operating device 2.

In a peak discriminator 17 of the sweep correlation, a magnitude of the maximum value of the sweep correlation value 124 is discriminated, thereby discriminating whether the sweep correlation value has significance or not.

A threshold value which is used for the significance discrimination about the magnitude of the maximum value of the sweep correlation value is obtained by using a delay reception signal power value S7 which is obtained by delaying the output of average power calculator 6 by the delay 7 and level converting it by a multiplier 8. That is, this threshold value is determined on the basis of the average power of the reception signal.

The reason why the threshold value is varied is because the result of the sweep correlation arithmetic operation changes in proportion to the level of the reception signal.

That is, this is because when the reception signal is at the standard level, even if C4 in FIG. 5 is suitable as a threshold value, if the level of the reception signal fluctuates and decreases, C5 in FIG. 5 is more suitable than C4.

An output S17 of the peak discriminator 17 shows a value at a sampling point k at which the correlation peak determined to have the significance was obtained. The signal S17 indicative of the position of the correlation peak is inputted to an adder 29. A value corresponding to a half of total number of correlation arithmetic operation has been preset in a constant register 30. In case of the embodiment, the value in the constant register 30 is equal to "7" which is a half of 15 that is the total number of correlation arithmetic operation. In the adder 29, the value of the constant register 30 is compared with the signal S17 indicative of the position of the actual correlation peak and a timing correction signal S29 according to a difference between them is generated. The correction signal S29 shows by which amount the actual correlation peak position in the reception signal is deviated from the specified value (value of the constant register 30).

A counter 23 is a counter for correcting a reset timing of the frame counter 24. The counter 23 is cleared by the null interval detection signal S19 and starts the up-counting operation.

An output of the counter 23 is compared by an comparator 25 with the frame counter reset timing correction value S29 obtained by adding the correlation peak position signal S17 and the value of the constant register 30 by the adder 29. When they coincide, the counter 23 generates a frame counter reset signal 4.

The frame counter 24 is cleared by the frame counter reset signal 4 and generates a control signal S24 for the receiver Rx. The frame counter reset signal 4 presents a demodulation start point of the demodulator 40. That is, it is a reference signal for deciding the sampling start point of the data symbol in the received signal.

In case of transmitting data by using a radio transmission path such as space or the like, the receiver Rx receives a transmission signal which has a multipath fading and in which besides the transmission signal itself (hereinafter, referred to as a principal wave) which directly arrives from the transmitter Tx, a delayed transmission signal (hereinafter, referred to as a reflection wave) generated as a result of that the transmission signal is reflected by a mountain, a building, or the like has been synthesized.

As for the transmission signal having the multipath fading, since the principal wave and the reflection wave are synthesized on the transmission path, if the delay wave (reflection wave) of the principal wave is added to the transmission signal (principal wave) in which the sweep symbol has been inserted, as shown in FIG. 6A, in addition to a peak C1 of the principal wave, a peak C6 due to the reflection wave is caused as a result of the correlation arithmetic operation.

Since the multipath fading changes with the elapse of time, as a result of the correlation arithmetic operation, each peak successively changes as shown in FIGS. 6B and 6C.

In FIGS. 6A, 6B, and 6C, C4 denotes the threshold value for discrimination about the significance of the correlation arithmetic operation result.

In such a situation, in the case where the sync detection is performed from the reception signal by the receiver Rx shown in FIG. 3, the frame timing as an output of the counter 24 of the receiver is adjusted so that the maximum value (value exceeding the threshold value for discrimination about the significance) of the correlation arithmetic operation result is matched with the position of the reference timing (k=7 which is the intermediate value of the total number of correlation arithmetic operations) of the receiver.

As shown in FIGS. 6A and 6C, when the signal having the multipath fading as mentioned above is first received by the receiver as a principal wave peak C1 of the value exceeding the threshold value C4, the principal wave can be matched with the reference timing k=7 of the receiver.

However, as shown in FIG. 6B, in the case where the principal wave peak C1 does not exceed the threshold value C4 but the peak C6 of the reflection wave has a value exceeding the threshold value C4, a problem such that it is erroneously regarded that the reflection wave is a signal serving as a reference for synchronization, the reflection wave is matched with the reference timing k=7 of the receiver as shown in FIG. 7A, and the receiver is synchronized with the reflection wave.

SUMMARY OF THE INVENTION

It is an object of the invention to solve the above problems and to provide a data transmission system of the OFDM system which can decrease probability of synchronization with the reflection wave via a multi-path and increase probability of synchronization with a principal wave and perform a stable synchronization detection even in a situation where a multipath fading exists and to provide a method for such a system.

According to a data transmission system utilizing an orthogonal frequency division multiplex of the invention, a signal in which predetermined sync symbols have been inserted between data symbol groups at predetermined intervals is transmitted. According to a synchronization control method of the invention, the synchronization is obtained by the following steps in a receiver apparatus. First an arithmetic calculation is executed for obtaining a degree of mutual correlation of a reception signal which was orthogonal frequency division multiplexed and a predetermined sync symbol pattern a predetermined number of times in a predetermined arithmetic calculation window. The correlation values obtained after a predetermined number-th arithmetic calculation from the intermediate of the total number of arithmetic calculations are subjected to a predetermined reduction process. The maximum value is detected from a correlation value obtained in the predetermined former period and the adjusted correlation value in the predetermined latter period. A reference signal to demodulate the reception signal is formed on the basis of information of a time base position of a signal at the time when the maximum value is obtained.

Further, according to a data transmission system utilizing an orthogonal frequency division multiplex of another aspect of the invention, a signal in which data symbols to which guard intervals have been added are coupled is transmitted. According to a synchronization control method of the invention, synchronization is obtained in a receiver apparatus in the following steps. An arithmetic calculation is executed for obtaining a degree of mutual correlation of a reception signal which was orthogonal frequency division multiplexed and a signal obtained by delaying said reception signal by one effective symbol period a predetermined number of times in a predetermined arithmetic calculation window. The correlation values obtained after a predetermined number-th arithmetic calculation from the intermediate of the total number of arithmetic calculations are subjected to a predetermined reduction process. The maximum value is detected from a correlation value obtained in the predetermined former period and the adjusted correlation value in the latter period is detected. A reference signal to demodulate the reception signal is formed on the basis of information of a time base position of a signal at the time when the maximum value is obtained.

Thus, since a process for forcedly reducing a correlation arithmetic operation or calculation value of a reflection wave which is generated with a delay from a principal wave due to a multipath is performed, the correlation value of the reflection wave can be consequently set to be smaller than a threshold value for discriminating significance of a peak value of the correlation arithmetic operation value. Therefore, the problem such that the reference timing of the receiver is matched by the reflection wave and synchronized with the reflection wave does not occur. That is, even in a situation where the multipath fading exists, a confidence degree at which the receiver is synchronized with the principal wave can be improved. The confidence degree at which the receiver is synchronized with the principal wave is also improved even against the existence of the reflection wave having a long delay time without increasing the correlation arithmetic operation amount, and the synchronization can be stably and quickly obtained.

BRIEF DESCRIPTION OF THE DRAWINGS

FIGS. 6A, 6B, and 6C are diagrams for explaining the relations between the sweep correlation arithmetic operation value and the significance discrimination threshold value in the case where a reflection wave exists after a principal wave;

FIG. 9 is a block diagram showing a construction of the third embodiment of a data transmission system of the OFDM system of the invention.

DESCRIPTION OF THE EMBODIMENTS

Figure 1:
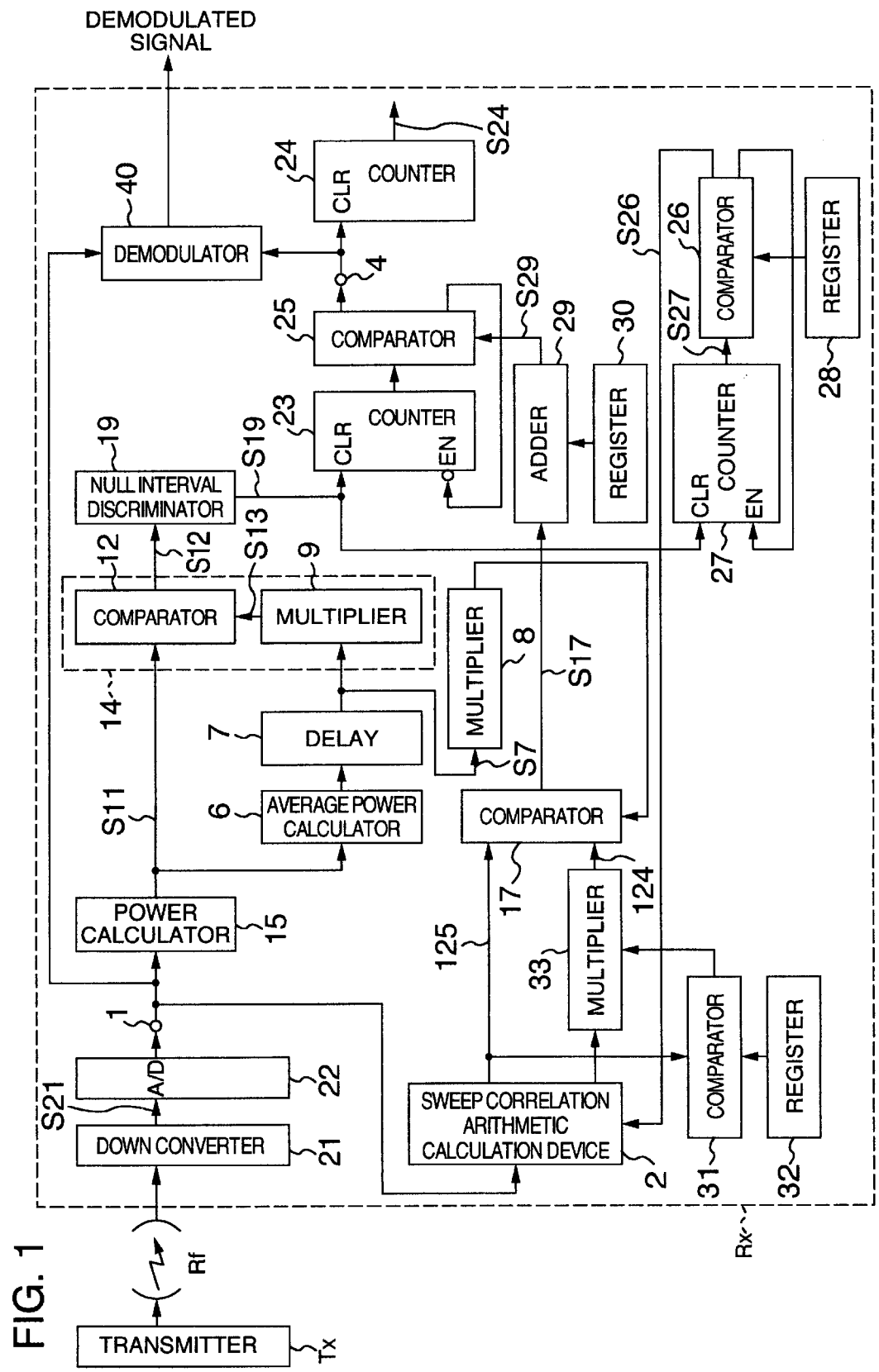
FIG. 1 is a block diagram showing a construction of an embodiment of a data transmission system of the OFDM system of the invention.

An embodiment of the invention will now be described in detail hereinbelow with reference to FIGS. 1, 2, 7A to 7C, and 8A to BD. In FIG. 1, the same and similar component elements as those in FIG. 3 are designated by the same reference numerals. The embodiment is constructed by adding a comparator 31, a constant 32 (register), and a multiplier 33 to a portion of the sweep correlation arithmetic operating device 2 and sweep correlation peak discriminator 17 in the receiver of FIG. 3. The constant 32 is stored or recorded in a register in which a predetermined numerical value has been confirmed.

The multiplier 33 is provided between the sweep correlation arithmetic operating device 2 and the sweep correlation peak discriminator 17. The correlation arithmetic operation value which is outputted from the sweep correlation arithmetic operating device 2 is multiplied by 1/N (where N>1) time by the multiplier 33 in the following manner.

As a specific example, when a gain of the multiplier 33 is set to 1/N, among 15 times of the arithmetic operation (although the number of arithmetic operating times is set to 15 in the embodiment, it can be set to any value so long as it can be realized), N=1 (one time) is set for the first ten times and N=2 (½ time) is set for the remaining five times.

That is, according to this operation, since the sweep correlation arithmetic operating device 2 outputs both of the sweep correlation value 124 and the number of arithmetic operating times 125, for example, by setting a value "10" into the constant register 32, when the number of arithmetic operating times 125 reaches 10, a signal indicative of a comparison result is generated from the comparator 31 and a magnification of the multiplier 33 is switched from 1 time to ½ time.

Figure 2:
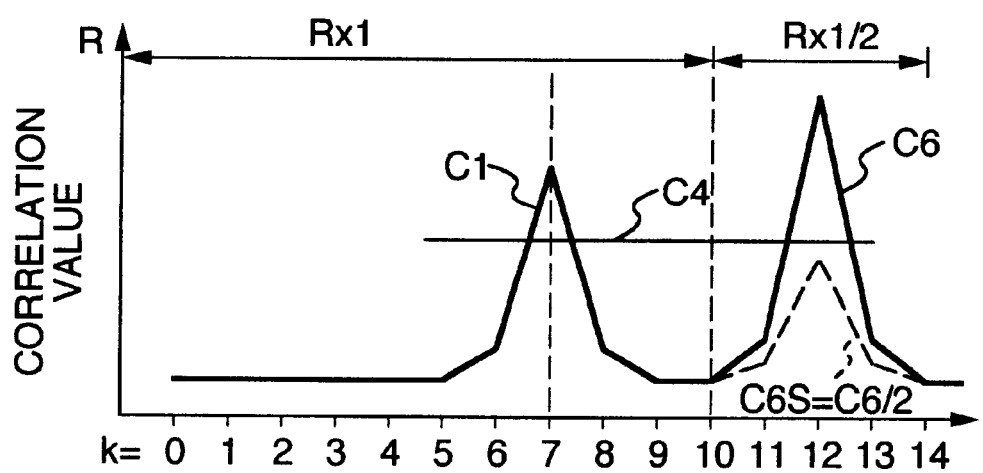
FIG. 2 is a diagram for explaining the operation of a sweep correlation arithmetic operation in the synchronizing system of the invention.
Figure 3:
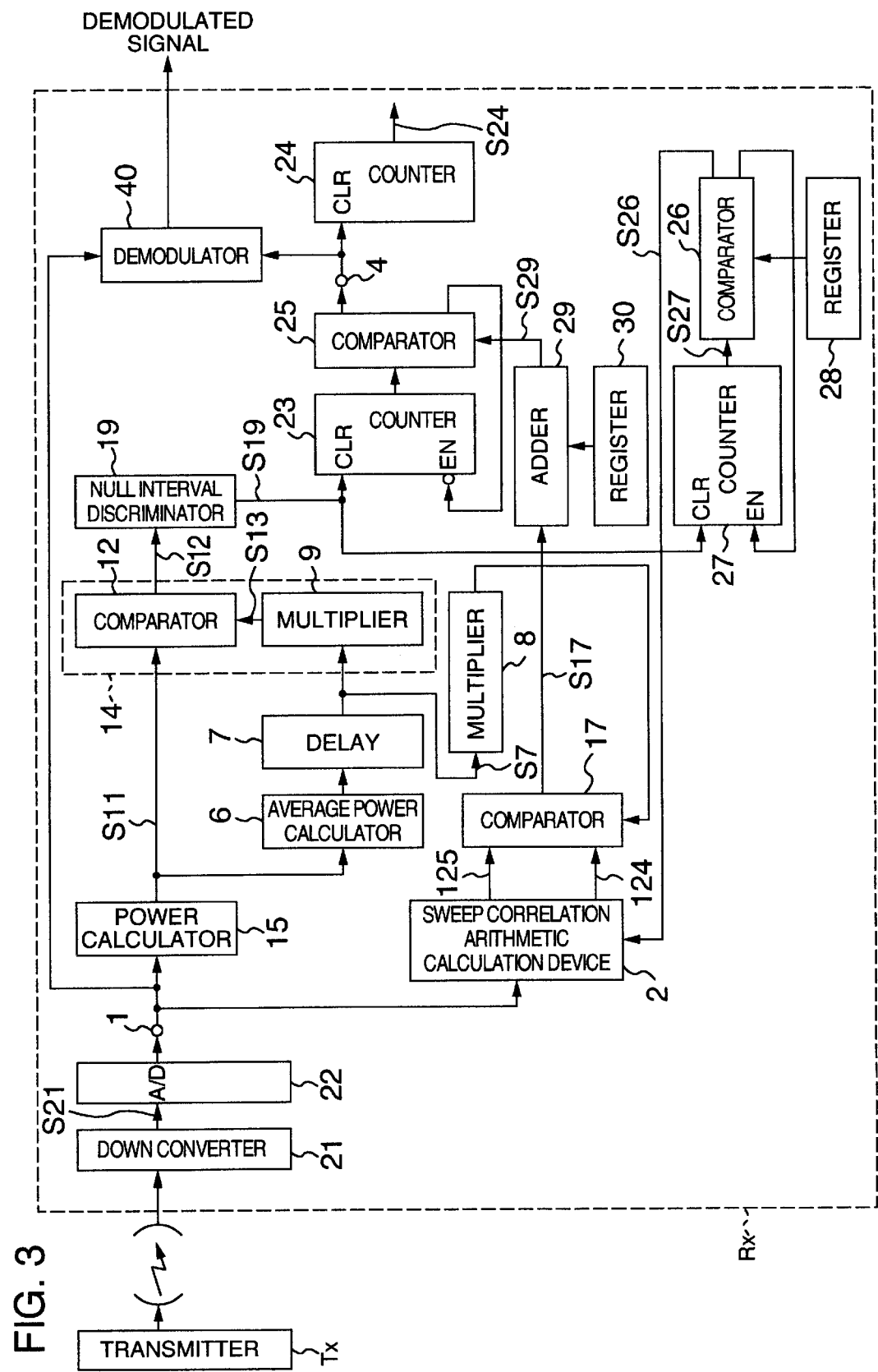
FIG. 3 is a block diagram showing a construction of an example of a conventional data transmission system of the OFDM system.
Figure 4:
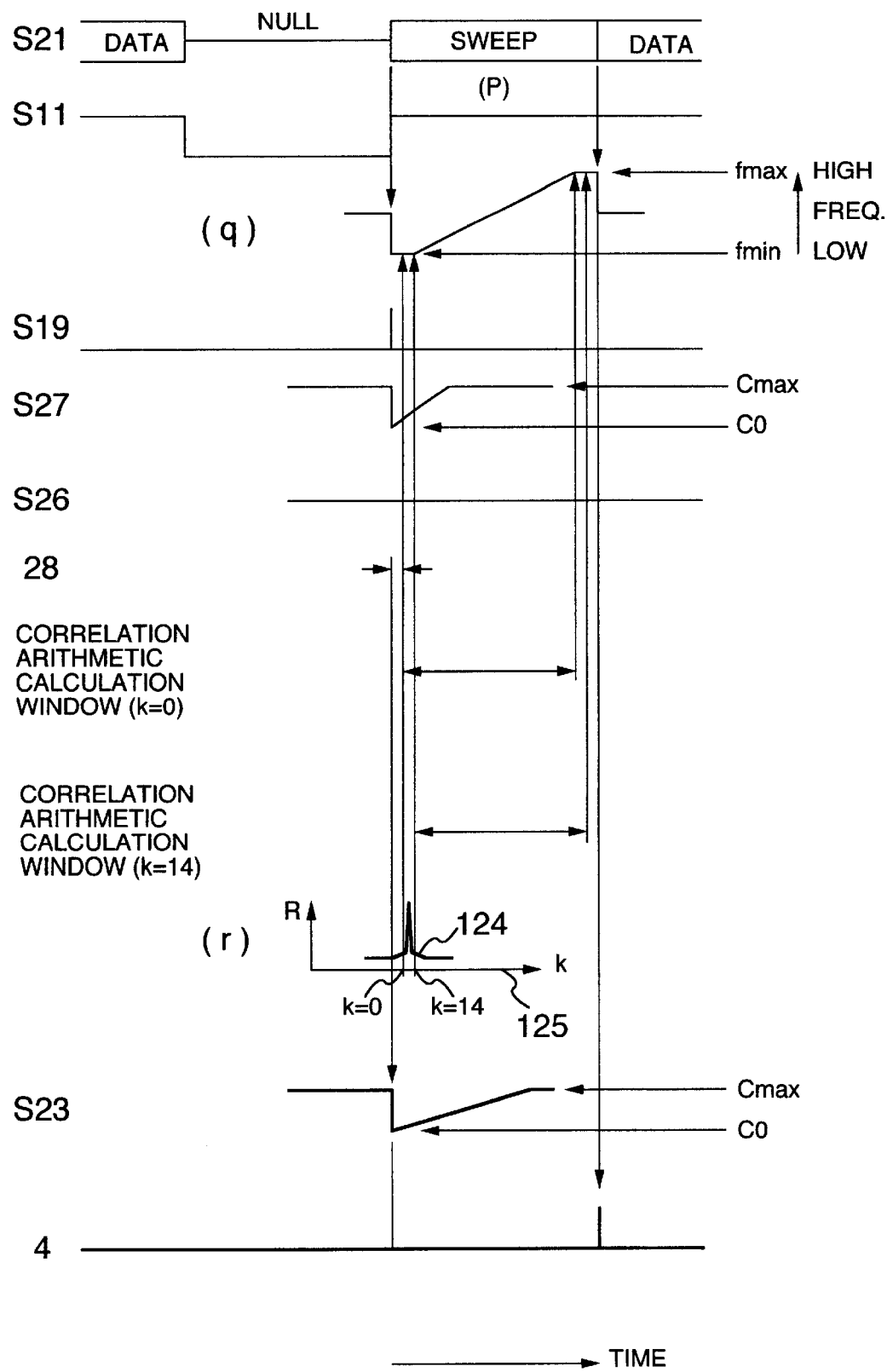
FIG. 4 is a signal waveform diagram for explaining the relation between a reception signal and a result of a sweep correlation arithmetic operation.

FIG. 2 shows an example of a synchronization detection of a signal including a multipath fading in case of setting N=2 as mentioned above.

If the correlation peak of the reflection wave is larger than that of the principal wave due to an influence of the multipath fading, as shown in FIG. 2, as a result of obtaining of the correlation arithmetic operation value, a correlation value of the delay wave C6 is larger than that of the principal wave C1.

Therefore, since the correlation value of the reflection wave is large in this state, the receiver Rx is synchronized with the reflection wave.

However, according to the invention, as shown in FIG. 2, since the correlation value obtained by performing the correlation arithmetic operation is held to one time until the sampling points k=0 to 10 and it is multiplied by 1/N (N=2 in this embodiment) time until k=11 to 14, the correlation value C6 of the reflection wave becomes a correlation value C6S of reflection wave (shown by a broken line).

Upon setting of the switching of the magnification, by designating the value of the constant register 32 in FIG. 1 to "11", the magnification is switched at the 11th sampling point.

Here, the value N may be determined such that the resultant value of the correlation value of the reflection wave becomes lower than a correlation value of the principal wave. However, since the correlation values are varied in accordance with the signal transmission condition, the N value may be determined to a value lower than the correlation value of the principal wave on the basis of the results of several experimental transmissions.

A peak of correlation value of the principal wave normally appears at the intermediate point of the total number of arithmetic calculations. However, such peak point sometimes appear at a point shifted from the intermediate point by plus or minus several calculation times. So, the gain switching point to 1/N may be determined at the point where after the several number-th (the third time calculation point in the embodiment) arithmetic calculation from the intermediate of the total number of arithmetic calculations. Accordingly, the correlation values of the reflection wave after a predetermined number-th arithmetic calculation from the intermediate of the total number of arithmetic calculations become 1/N.

That is, although the correlation value of the reflection wave of the received signal is large and the receiver is synchronized with the reflection wave in this state, by using the above means, it is determined that the correlation value of the principal wave is larger than that of the reflection wave, so that the receiver can be synchronized with the principal wave.

An example in the case where the intermediate of the total number of the correlation arithmetic calculations, namely, the sampling point at which the correlation value becomes the maximum is changed from k=7 to k=11 will now be described as a second embodiment with reference to FIGS. 8A to 8D.

Figure 5:
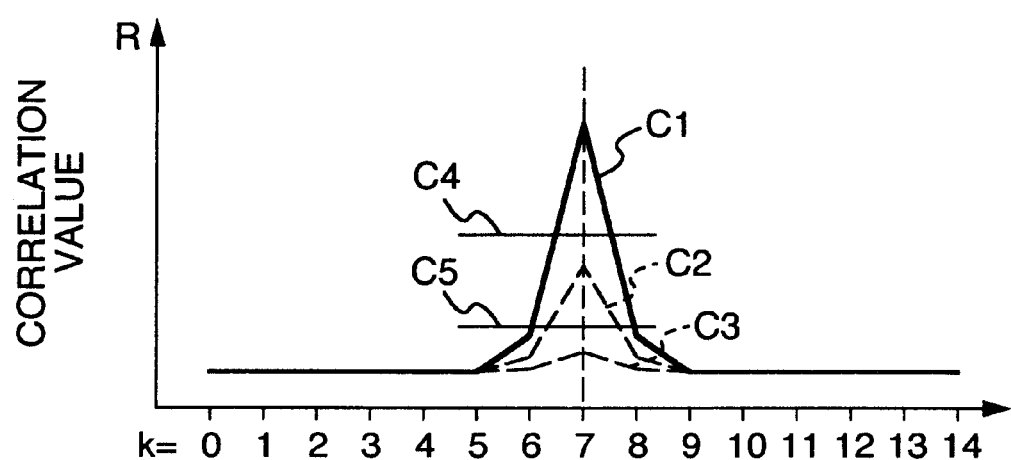
FIG. 5 is a diagram for explaining the relation between a sweep correlation arithmetic operation value and a significance discrimination threshold value.

In each receiver Rx in FIGS. 3 and 1, a frame timing of the receiver is matched so as to obtain the maximum value of the correlation arithmetic operation at the eighth time among the correlation arithmetic operations of 15 times when the synchronization between the transmitter and the receiver is obtained as shown in FIG. 5. It is determined by the set value of the constant register 28.

Figure 7A:
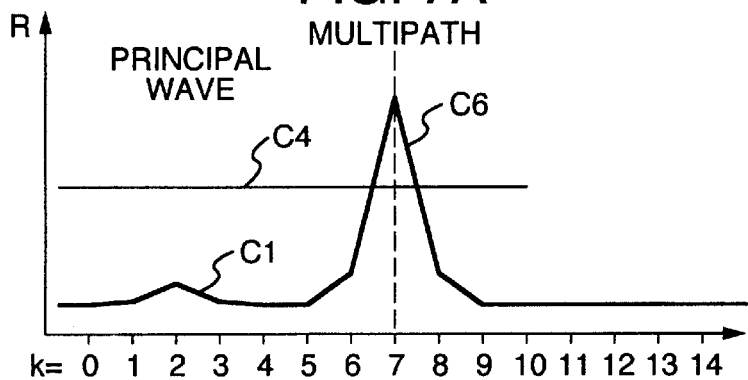
FIGS. 7A, 7B, and 7C are diagrams for explaining the relations between the sweep correlation arithmetic operation value and the significance discrimination threshold value in the case where a reflection wave exists after a principal wave.
Figure 7B:
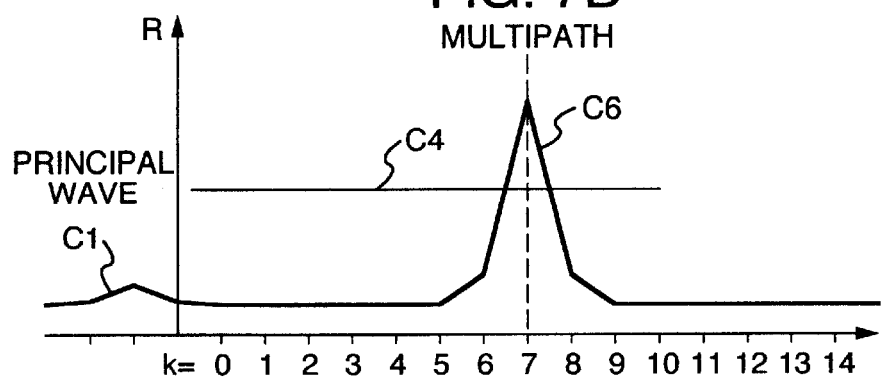

In the case where, for example, a clock frequency at which an FFT (high speed Fourier transform) process is performed to the reception signal in the receiver Rx is set to fs [Hz] and the synchronization is first detected in the receiver, in case of the reception signal having a delay of (1/fs) 9 [sec] later than the principal wave and having a reflection wave in which the correlation value of the delay wave is larger than that of the principal wave as shown in FIG. 7B, if the receiver is the receiver of FIG. 3, the reflection wave C6 is detected.

Figure 7C:
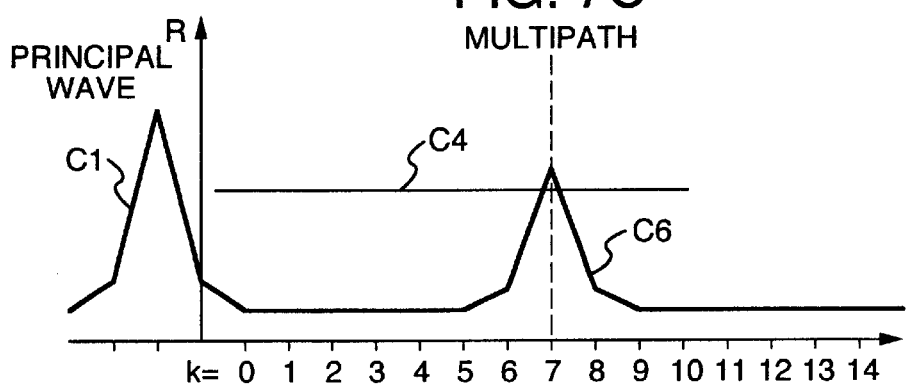

In the synchronization detection in the next frame, assuming that in a situation shown in FIG. 7C, a result of the subsequent correlation arithmetic operation repeats the states of FIGS. 7B and 7C, the principal wave cannot be detected and the receiver is held in a state where it is synchronized with the reflection wave.

Figure 8A:
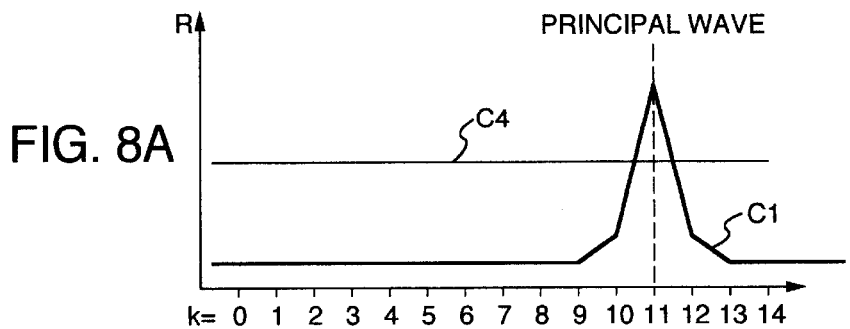
FIGS. 8A, 8B, 8C, and 8D are diagrams for explaining the relations between the sweep correlation arithmetic operation value and the significance discrimination threshold value in a receiver of the data transmission system of the invention.

Therefore, in the second embodiment, as shown in FIG. 8A, for example, the frame position of the receiver is moved and adjusted so as to obtain the maximum value of the correlation arithmetic operation at the 12th time (k=11) among the correlation arithmetic operations of 15 times.

Specifically speaking, if the value set in the constant register 28 in FIG. 1 is reduced from "15" in the first embodiment by 4, the correlation arithmetic operation start point is set to the position of 4 samples before. Therefore, the peak position (sampling point k) of the correlation arithmetic operation value is shifted by 4 and is set to 11 as shown in FIG. 8A.

At the same time, to increase the value of the constant register 32 in FIG. 1 by 4, the output of the sweep correlation peak discriminator 17 is increased by 4. Therefore, the frame counter reset timing correction value S29 which is inputted to the adjuster 25 is increased by 4, so that the frame counter reset signal 4 which is inputted to the demodulator 40 is delayed by the time corresponding to four samples.

To prevent such a situation, the value of the constant 30 in FIG. 1 is decreased by 4 lest so as to avoid the timing of the frame counter reset signal 4 moving.

Figure 8B:
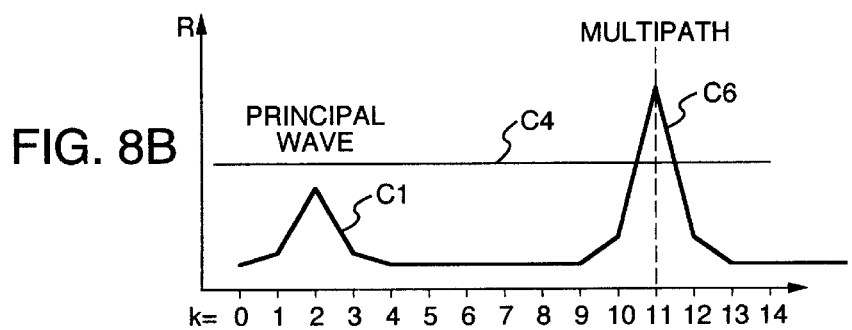

By this method, in the case where the synchronization is first detected by the receiver, even in the correlation arithmetic operations of 15 times, since the frame timing has been adjusted so as to obtain the maximum value of the correlation arithmetic operation at the 12th time as shown in FIG. 8B, the reflection wave C6 having a delay of (1/fs)×9 [sec] later than the principal wave C1 can be confirmed.

Figure 8C:
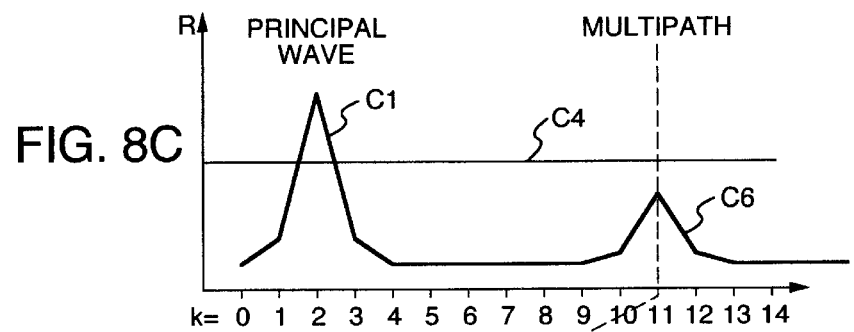
Figure 8D:
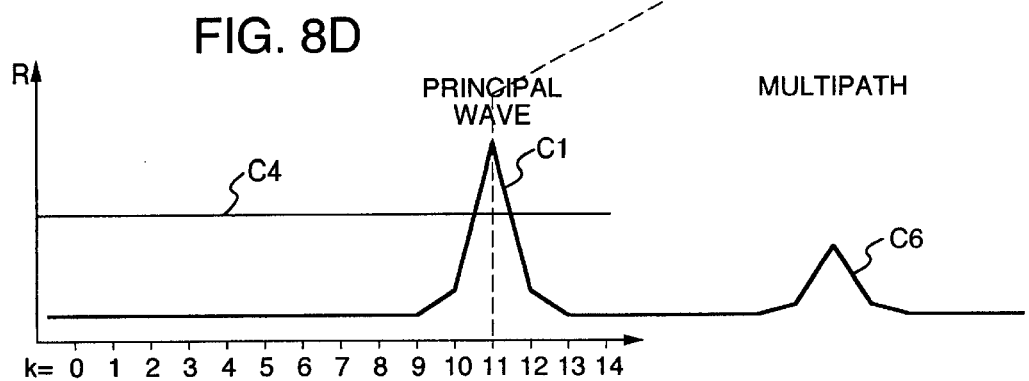

In the next frame, if the correlation value of the reflection wave C6 is equal to or less than the threshold value C4 as shown in FIG. 8C, the resynchronization process is implemented and the receiver is synchronized with the principal wave C1 of the correlation value which is equal to or larger than the threshold value C4 as shown in FIG. 8D.

When the receiver is once synchronized with the principal wave C1, since the reflection wave C6 is deviated out of the interval of the correlation arithmetic operations of 15 times as shown in FIG. 8D and cannot be detected, the receiver is stably synchronized with the principal wave after that.

In the second embodiment, the time base point where the maximum correlation value is obtained is set at the 12th calculation in 15 times of correlation arithmetic calculations by shifting the point from the last calculation. However, in consideration with the fact that such peak point sometimes appear at a point shifted from the intermediate point by plus or minus several calculation times, it is preferable to set this time base point where the maximum correlation value is obtained at several times before the last calculation.

In the second embodiment, since the time base position of the signal at the time when the maximum value of the correlation value is obtained is arranged on the later side (k=11) from the center in the total number of the correlation arithmetic operations, a probability that the reflection wave is out of the window of the correlation arithmetic operation is large and a probability that the receiver is synchronized with the reflection wave will be fairly small. Therefore, it is possible to cease the operation for increasing the arithmetic operation value in the latter half of the correlation arithmetic operation window by 1/N time by the multiplier 33 as shown in the first embodiment. However, when considering a case where the reflection wave larger than the principal wave is received at the sampling point of k=12, 13, or 14, even in the second embodiment, it is preferable to increase the arithmetic operation value in the latter half of the correlation arithmetic operation window by 1/N time by the multiplier 33.

The third embodiment of the invention will now be described with reference to FIGS. 9 and 10. In the first and second embodiments which have already been described, the synchronization process of the OFDM signal in which the null period and sweep symbol were added as sync symbols to the data symbol has been described as an example. In the third embodiment, no sync symbol is used in the transmission signal but one symbol of the transmission signal which is transmitted by the transmitter is constructed by the time base signal obtained by being modulated by the OFDM system and a guard interval added to a head of the time base signal. The guard interval is produced by copying a predetermined tail part of the time base signal.

It is also possible to perform a correlation arithmetic operation similar to that in the first or second embodiment by using the data symbol having the guard interval without inserting the null period and sweep symbol for the purpose of synchronization detection as mentioned above and to allow the receiver to be synchronized with the transmitter on the basis of the correlation value.

In case of the correlation system by the guard interval, it is necessary to first reproduce a reference signal which indicates a start position of each symbol of the reception signal or a boundary position of the symbol of the reception signal.

A specific method of reproducing the reference signal indicating the start of the symbol from the reception baseband signal will now be described with reference to FIGS. 9 and 10. FIG. 9 shows a construction of an OFDM system data transmission system of a guard interval correlation system. In FIG. 9, the same and similar component elements and functions as those in FIG. 1 are designated by the same reference numerals. FIG. 10 shows a signal in each section of the circuit in FIG. 9.

An RF transmission signal which was OFDM modulated by the transmitter Tx is converted into a baseband frequency signal in the down-converter 21 of the receiver Rx. This signal is converted into a digital baseband signal by the A/D converter 22 and outputted to the terminal 1.

Figure 10:
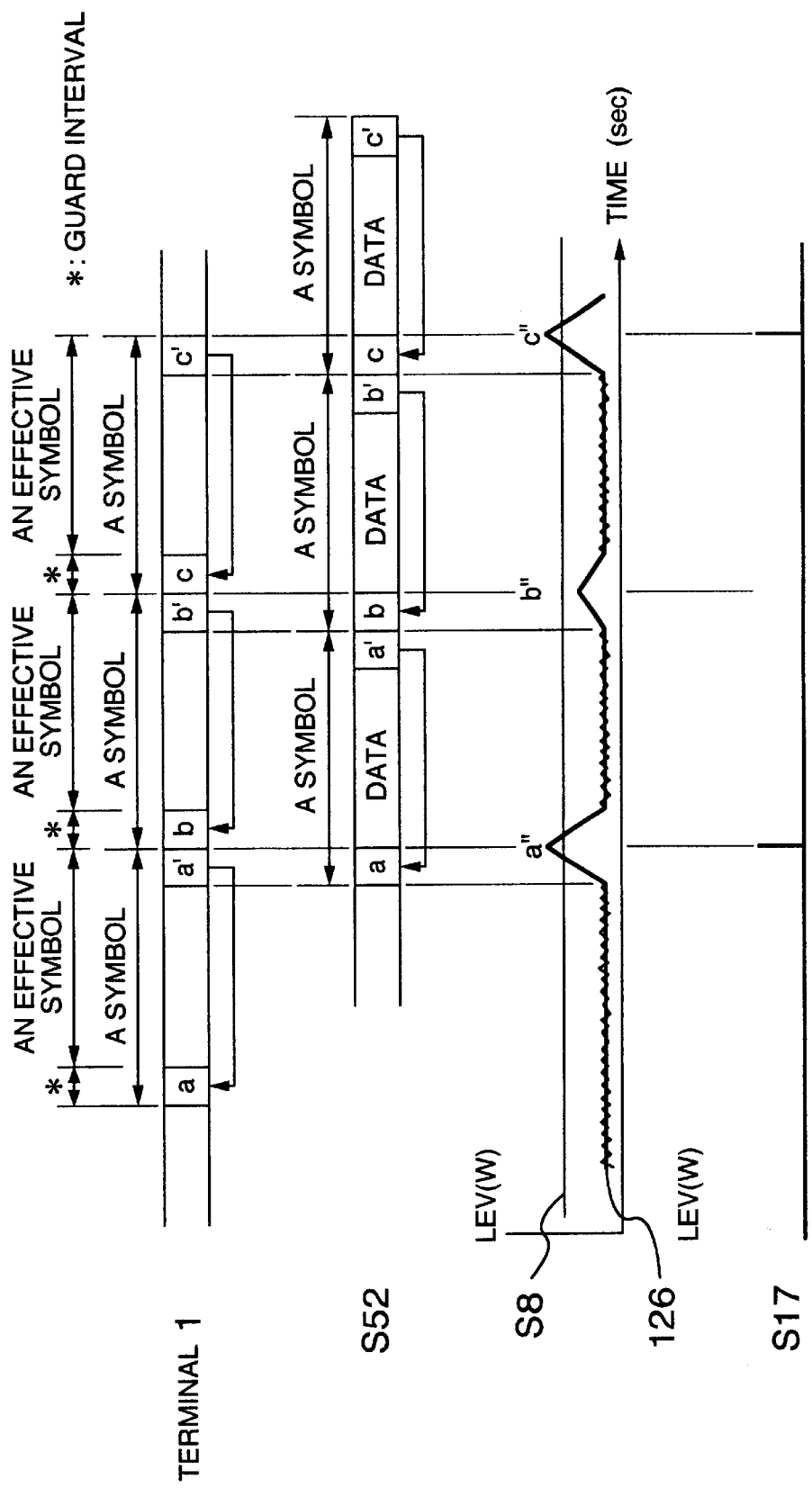
FIG. 10 is a signal diagram for explaining the synchronizing operation of the system shown in FIG. 9.

The signal at the terminal 1 is shown at the top of a signal diagram of FIG. 10. The digital reception signal at the terminal 1 is delayed by a time corresponding to one effective symbol (time during which actual data including no guard interval is transmitted) by a delay 52, so that a delay reception signal S52 is obtained.

A mutual correlation values of the digital reception signal at the terminal 1 and the delay reception signal S52 is calculated by a guard correlation arithmetic operating device 51. An output of the guard correlation arithmetic operating device 51 is shown by a guard correlation value 126 in FIG. 10.

As shown in FIG. 10, a copy of a portion (guard interval) of "a" is added by copying "a'" of the end of the data symbol becomes a start portion of the data symbol is added to the digital reception signal at the terminal 1. Therefore, the highest correlation peak is obtained when the signal of "a'"

of the digital reception signal coincides in the time base with the signal of "a" of the delay reception signal S52 which is delayed by one effective symbol period. In this case, a correlation peak as shown at "a''" is obtained as for the guard correlation value 126. Similarly, "b''" is obtained from "b'" and "b" and "c''" is obtained from "c'" and "c", respectively.

The signal which is used for obtaining the correlation in the correlation system based on the guard interval and that in the sweep correlation system for obtaining the synchronization from the signal including the null interval and the sweep symbol in the first or second embodiment are different. However, with respect to the guard correlation value 126 in FIG. 9 and the sweep correlation value 126 in FIG. 10, correlation peaks similar to those in the first or second embodiment. In the third embodiment, therefore, since a method for a synchronizing process after the correlation value was obtained is similar to that in the first or second embodiment, its description is omitted. Also in the third embodiment, the influence of the reflection wave can be reduced in a manner similar to the first (second) embodiment.

According to the first, second and third embodiments of the invention, the correlation values obtained after a predetermined number-th correlation arithmetic calculation from the intermediate of the total number of arithmetic calculations are reduced by multiplying with 1/N in the multiplier 33 so as to avoid the synchronization of the receiver with the reflected wave. The present invention includes another embodiment wherein a output switching device may be used instead of the multiplier. The switching device replaces the correlation values 124 or 126 obtained in the latter half calculation times with a predetermined small value on the basis of the output of the comparator 31. The predetermined small value may be, for example, a value lower than the output of the multiplier 8 that is a threshold value for decision of significance of the correlation value.

In the receivers Rx in FIGS. 1 and 9, the other portions excluding the down-converter 21 and A/D converter 22 or functions of a part of them can be also embodied by a software control using a high speed computer.

As described above, by using the invention, even in the signal having the multipath fading, the degree of confidence at which the receiver is synchronized with the principal wave can be improved. Also, since the confidence degree at which the receiver is synchronized with the principal wave is improved even against the existence of the reflection wave having a long delay time without increasing the correlation arithmetic operation amount, the data transmission system which can stably detect the synchronization can be provided.

What is claimed is:

1. A synchronization control method used in a demodulating unit, to which orthogonal frequency division multiplexed (OFDM) signal is applied, said OFDM signal including a null interval, predetermined sync symbol and a data symbol at a predetermined intervals, comprising the steps of:

receiving said OFDM signal;

detecting a power value of the received OFDM signal;

comparing the detected power value with a first threshold value, said first threshold value being generated from an average power of said received OFDM signal;

detecting said null interval based on a result of said comparison between said detected power value and said first threshold value;

executing arithmetic calculations in a plurality of arithmetic calculation windows for obtaining correlation values between said received OFDM signal and a predetermined sync symbol pattern;

applying a predetermined reduction to correlation values corresponding to a predetermined part of said correlation values so that the reduced correlation values of said corresponding part do not exceed a predetermined value;

detecting a maximum value from said correlation values obtained in said arithmetic calculations and said reduced correction values; and detecting information of a position of said predetermined sync symbol of said OFDM signal based on a timing of said maximum value and said null interval for demodulating said received OFDM signal in said demodulating unit.

2. A synchronization control method for a data transmission system utilizing an orthogonal frequency division multiplexed signal for transmitting a transmission signal comprising a predetermined sync symbol and a data symbol at predetermined intervals, comprising the steps of:

sequentially executing arithmetic calculations shifted by a clock period for obtaining a correlation value between a reception signal being orthogonal frequency division multiplexed and a predetermined sync symbol pattern in a predetermined arithmetic calculation window;

applying a predetermined reduction to correlation values obtained after a predetermined number of arithmetic calculations from an intermediate of a total number of said arithmetic calculations so that the reduced correlation values do not exceed a predetermined value; and, detecting a maximum value from correlation values obtained in said arithmetic calculations and obtaining a reference signal for demodulating said reception signal on the basis of information of a time position where said maximum value is obtained, wherein said step of applying a predetermined reduction to correlation values is a step of multiplying by 1/N (where N>1).

3. A method according to claim 1, wherein said maximum value is compared with a second threshold value and, when said maximum value is larger than said second threshold value, said predetermined sync symbol for demodulating said received OFDM signal is obtained on the basis of the information of the position where said maximum value is obtained.

4. A synchronization control method for a data transmission system utilizing an orthogonal frequency division multiplexed signal for transmitting a transmission signal comprising a predetermined sync symbol and a data symbol at predetermined intervals, comprising the steps of:

sequentially executing arithmetic calculations shifted by a clock period for obtaining a correlation value between a reception signal being orthogonal frequency division multiplexed and a predetermined sync symbol pattern in a predetermined arithmetic calculation window;

applying a predetermined reduction to correlation values obtained after a predetermined number of arithmetic calculations from an intermediate of a total number of said arithmetic calculations so that the reduced correlation values do not exceed a predetermined value; and, detecting a maximum value from correlation values obtained in said arithmetic calculations and obtaining a reference signal for demodulating said reception signal on the basis of information of a time position where said maximum value is obtained, wherein said maximum value is compared with a predetermined threshold value and, when said maximum value is larger than said threshold value, said reference signal for demodulating said reception signal is obtained on the basis of the information of the time position where said maximum value is obtained, and wherein said correlation values resulting from said arithmetic calculations after said predetermined number of arithmetic calculations from said intermediate of the total number of said arithmetic calculations is adjusted so as to be smaller than said threshold value.

5. A synchronization control method for a data transmission system utilizing an orthogonal frequency division multiplexed signal for transmitting a transmission signal comprising a predetermined sync symbol and a data symbol at predetermined intervals, comprising the steps of:

sequentially executing arithmetic calculations shifted by a clock period for obtaining a correlation value between a reception signal being orthogonal frequency division multiplexed and a predetermined sync symbol pattern in a predetermined arithmetic calculation window;

applying a predetermined reduction to correlation values obtained after a predetermined number of arithmetic calculations from an intermediate of a total number of said arithmetic calculations so that the reduced correlation values do not exceed a predetermined value; and, detecting a maximum value from correlation values obtained in said arithmetic calculations and obtaining a reference signal for demodulating said reception signal on the basis of information of a time position where said maximum value is obtained, wherein said maximum value is compared with a predetermined threshold value and, when said maximum value is larger than said threshold value, said reference signal for demodulating said reception signal is obtained on the basis of the information of the time position where said maximum value is obtained, and wherein said threshold value is set in accordance with a level of average power of said reception signal.

6. A synchronization control method for a data transmission system utilizing an orthogonal frequency division multiplexed signal for transmitting a transmission signal comprising a predetermined sync symbol and a data symbol at predetermined intervals, comprising the steps of:

sequentially executing arithmetic calculation shifted by a clock period for obtaining a correlation value between a reception signal being orthogonal frequency division multiplexed and a predetermined sync symbol pattern in a predetermined arithmetic calculation window;

applying a predetermined reduction to correlation values obtained after a predetermined number of arithmetic calculations from an intermediate of a total number of said arithmetic calculations so that the reduced correlation values do not exceed a predetermined value; and detecting a maximum value from correlation values obtained in said arithmetic calculations and obtaining a reference signal for demodulating said reception signal on the basis of information of a time position where said maximum value is obtained, wherein a demodulation unit adjusts a phase of said transmission signal so that said time position for obtaining said maximum correlation value is located before a predetermined number of times from a last time of said arithmetic calculation of said correlation is performed.

7. A synchronization control method in an orthogonal frequency division multiplexed (OFDM) signal receiver, said OFDM signal including a null interval, a predetermined sync symbol and a data symbol at a predetermined intervals, comprising the steps of:

receiving said OFDM signal;

detecting a power value of the received OFDM signal;

executing arithmetic calculations in a plurality of arithmetic calculation windows for obtaining a correlation value between said received OFDM signal and a signal obtained by delaying said received OFDM signal by one effective symbol period;

applying a predetermined reduction to correlation values corresponding to a predetermined part of said correlation values, so that the reduced correlation values do not exceed a predetermined value;

detecting a maximum value from correlation values obtained in said arithmetic calculations and said reduced correlation values of the predetermined part, in comparison with said average power of said received OFDM signal; and detecting information of a start position of said data symbol of said OFDM signal based on a timing of said maximum value for demodulating said OFDM signal in a demodulating unit.

8. A data transmission system including a demodulating unit, to which an orthogonal frequency division multiplex multiplexed (OFDM) signal is applied said OFDM signal comprising a null interval, a predetermined sync symbol and a data symbol at predetermined intervals, comprising:

an input unit for inputting said OFDM signal;

a power calculator for detecting a power value of said OFDM signal;

a comparator for comparing said detected power value with a first threshold value, said first threshold value being generated from an average power of said OFDM signal;

a detector for detecting said null interval based on the compared result between said detected power value and said first threshold value;

a correlation arithmetical operating unit for executing arithmetic calculations in a plurality of arithmetic calculation windows for obtaining a correlation value between said received OFDM signal and a predetermined sync symbol pattern;

a signal processing unit for applying a predetermined reduction to correlation values corresponding to a predetermined part of said correlation values so that the reduced correlation values do not exceed a predetermined value; and a reference signal generating unit for detecting a maximum value from said correlation values obtained in said arithmetic calculations and said reduced correlation values of said predetermined part, and for detecting information of a position of said predetermined sync symbol of said OFDM signal based on a timing of said maximum value and said null interval for demodulating said OFDM signal in said demodulating unit.

9. A data transmission system utilizing an orthogonal frequency division multiplexed signal for transmitting a transmission signal comprising a predetermined sync symbol and a data symbol at predetermined intervals, comprising:

a correlation arithmetical operating unit for sequentially executing arithmetic calculation shifted by a clock period for obtaining a correlation value between a reception signal being orthogonal frequency division multiplexed and a predetermined sync symbol pattern in a predetermined arithmetic calculation window;

a signal processing unit for applying a predetermined reduction to correlation values obtained after a predetermined number of arithmetic calculations from an intermediate of a total number of said arithmetic calculations so that the reduced correlation values do not exceed a predetermined value; and a reference signal generating unit for detecting a maximum value from correlation values obtained in said arithmetic calculations and forming a reference signal for demodulating said reception signal on the basis of information of a time position where said maximum value is obtained, wherein said signal processing unit includes a multiplier for multiplying by 1/N (where N>1).

10. A data transmission system according to claim 8, further comprising means for comparing said maximum value with a second threshold value, and wherein when said maximum value is larger than said threshold value, said reference signal generating unit obtains the reference signal for demodulating said OFDM signal on the basis of the information of the position where said maximum value is obtained.

11. A data transmission system utilizing an orthogonal frequency division multiplexed signal for transmitting a transmission signal comprising a predetermined sync symbol and a data symbol at predetermined intervals, comprising:

a correlation arithmetical operating unit for sequentially executing arithmetic calculation shifted by a clock period for obtaining a correlation value between a reception signal being orthogonal frequency division multiplexed and a predetermined sync symbol pattern in a predetermined arithmetic calculation window;

a signal processing unit for applying a predetermined reduction to correlation values obtained after a predetermined number of arithmetic calculations from an intermediate of a total number of said arithmetic calculations so that the reduced correlation values do not exceed a predetermined value;

a reference signal generating unit for detecting a maximum value from correlation values obtained in said arithmetic calculations and forming a reference signal for demodulating said reception signal on the basis of information of a time position where said maximum value is obtained; and means for comparing said maximum value with a predetermined threshold value, and wherein when said maximum value is larger than said threshold value, said reference signal generating unit obtains the reference signal for demodulating said reception signal on the basis of the information of the time position where said maximum value is obtained, wherein said signal processing unit adjusts said correlation values in the arithmetic calculation after said predetermined number of arithmetic calculations from said intermediate of the total number of said arithmetic calculations so as to be smaller than said threshold value.

12. A data transmission system utilizing an orthogonal frequency division multiplexed signal for transmitting a transmission signal comprising a predetermined sync symbol and a data symbol at predetermined intervals, comprising:

a correlation arithmetical operating unit for sequentially executing arithmetic calculation shifted by a clock period for obtaining a correlation value between a reception signal being orthogonal frequency division multiplexed and a predetermined sync symbol pattern in a predetermined arithmetic calculation window;

a signal processing unit for applying a predetermined reduction to correlation values obtained after a predetermined number of arithmetic calculations from an intermediate of a total number of said arithmetic calculations so that the reduced correlation values do not exceed a predetermined value;

a reference signal generating unit for detecting a maximum value from correlation values obtained in said arithmetic calculations and forming a reference signal for demodulating said reception signal on the basis of information of a time position where said maximum value is obtained;

means for comparing said maximum value with a predetermined threshold value, and wherein when said maximum value is larger than said threshold value, said reference signal generating unit obtains the reference signal for demodulating said reception signal on the basis of the information of the time position where said maximum value is obtained; and means for changing said threshold value in accordance with a level of an average power of said reception signal.

13. A data transmission system utilizing an orthogonal frequency division multiplexed signal far transmitting a transmission signal comprising a predetermined sync symbol and a data symbol at predetermined intervals, comprising:

a correlation arithmetical operating unit for sequentially executing arithmetic calculation shifted by a clock period for obtaining a correlation value between a reception signal being orthogonal frequency division multiplexed and a predetermined sync symbol pattern in a predetermined arithmetic calculation window;

a signal processing unit for applying a predetermined reduction to correlation values obtained after a predetermined number of arithmetic calculations from an intermediate of a total number of said arithmetic calculations so that the reduced correlation values do not exceed a predetermined value; a reference signal generating unit for detecting a maximum value from correlation values obtained in said arithmetic calculations and forming a reference signal for demodulating said reception signal on the basis of information of a time position where said maximum value is obtained; and means for adjusting a phase of said transmission signal so that said time position for obtaining said maximum correlation value is located before a predetermined time from a last time of said arithmetic calculation of said correlation is performed.

14. A data transmission system demodulating unit, to which an orthogonal frequency division multiplexed (OFDM) signal is applied said OFDM signal comprising a guard interval and a data symbol, at predetermined interval comprising:

an input unit for inputting said OFDM signal;

a detector for detecting an average power of said received OFDM signal;

a correlation arithmetic operating unit for executing arithmetic calculations in a plurality of arithmetic calculation windows for obtaining a correlation value between said received OFDM signal and a signal obtained by delaying said received OFDM signal by one effective symbol period;

a signal processing unit for applying a predetermined reduction to correlation values corresponding to said predetermined part of said correlation values so that the reduced correlation values of said predetermined part do not exceed a predetermined value; and a reference signal generating unit for detecting a maximum value from said correlation values obtained in said arithmetic calculations and said reduced correlation values, and for detecting information of a start position of said data symbol of said OFDM signal based on a timing of said maximum value for demodulating said received OFDM signal in said demodulating unit.

15. A method according to claim 1, wherein said predetermined reduction is applied to correlation values obtained in the last several predetermined calculation windows, each of which is shifted.

16. A synchronization control method for a data transmission system utilizing an orthogonal frequency division multiplexed (OFDM) signal for transmitting a transmission signal comprising a predetermined sync symbol and a data symbol at predetermined intervals, comprising the steps of:

executing arithmetic calculations in a plurality of arithmetic calculation windows for obtaining correlation values between a received OFDM signal and a predetermined sync symbol pattern;

applying a reduction by 1/N, where N>1, to correlation values corresponding to a predetermined part of said correlation values, so that the reduced correlation values of said corresponding part do not exceed a predetermined value;

detecting a maximum value from said correlation values obtained in said arithmetic calculations and said reduced correlation values; and detecting information of a position of said predetermined sync symbol of said OFDM signal on the basis of a timing of said maximum value and said null interval for demodulating said received OFDM signal in said demodulating unit.

17. A method according to claim 3, wherein said reduced correlation values of said predetermined part are adjusted so as to be smaller than said second threshold value.

18. A synchronization control method for a data transmission system utilizing an orthogonal frequency division multiplexed (OFDM) signal for transmitting a transmission signal comprising a predetermined sync symbol and a data symbol at predetermined intervals, comprising the steps of:

executing arithmetic calculations in a plurality of arithmetic calculation windows for obtaining a correlation value between a received OFDM signal and a predetermined sync symbol pattern;

applying a predetermined reduction to said correlation values corresponding to a predetermined part of said predetermined arithmetic calculation windows obtained in said arithmetic calculations, so that the reduced correlation values do not exceed a predetermined value;

detecting a maximum value in comparison with a second threshold value from said correlation values obtained in said arithmetic calculations and said reduced correlation values, said second threshold value being set in accordance with a level of an average power of said OFDM signal; and detecting information of a position of said predetermined sync symbol of said OFDM signal on the basis of a timing of said maximum value for demodulating said received OFDM signal in a demodulating unit when said maximum value is larger than said second threshold value.

19. A method according to claim 1, wherein said demodulating unit adjusts a phase of said OFDM signal so that said position for obtaining said maximum correlation value is located before a predetermined several times from a last time of said arithmetic calculation of said correlation is performed.

20. A data transmission system utilizing an orthogonal frequency division multiplexed (OFDM) signal for transmitting a transmission signal comprising a predetermined sync symbol and a data symbol at predetermined interval, comprising:

a correlation arithmetic operating unit for executing arithmetic calculation in a plurality of arithmetic calculation windows for obtaining correlation values between said OFDM signal and a predetermined sync symbol pattern;

a signal processing unit for applying a reduction by 1/N, where N>1, to correlation values corresponding to a predetermined part of said correlation values so that the reduced calculation values do not exceed a predetermined value;

a reference signal generating unit for detecting a maximum value from said correlation values obtained in said arithmetic calculations and the reduced correlation values of said predetermined part; and detecting information of a position of said predetermined sync symbol of said OFDM signal on the basis of a timing of said maximum value for demodulating said received OFDM signal in a demodulating unit.

21. A data transmission system according to claim 10, wherein said signal processing unit adjusts said predetermined part of said correlation values so that said predetermined part of said correlation values obtained in the arithmetic become smaller than said second threshold value.

22. A data transmission system utilizing an orthogonal frequency division multiplexed (OFDM) signal for transmitting a transmission signal comprising a predetermined sync symbol and a data symbol at predetermined interval, comprising:

a correlation arithmetic operating unit for executing arithmetic calculations in a plurality of arithmetic calculation windows for obtaining correlation values between said OFDM signal and a predetermined sync symbol pattern;

a signal processing unit for applying a predetermined reduction to correlation values corresponding to a predetermined part of said correlation values so that the reduced calculations values of said predetermined part do not exceed a predetermined value; and a reference signal generating unit for detecting a maximum value in comparison with a second threshold value from said correlation values obtained in said arithmetic calculations and said reduced correlation values, said second threshold value being set in accordance with a level of an average power of said OFDM signal, wherein said reference signal generating unit detects information of a position of said predetermined sync symbol of said OFDM signal on the basis of a timing of said maximum value for demodulating said received OFDM signal in a demodulating unit when said maximum value is larger than said threshold value.

23. A data transmission system according to claim 8, further comprising:

means for adjusting a phase of said OFDM signal so that said position for obtaining said maximum correlation value is located before a predetermined several times from a last time of said arithmetic calculation of said correlation is performed.

* * * * *